(12) United States Patent
Umeda et al.

(10) Patent No.: US 6,211,594 B1
(45) Date of Patent: *Apr. 3, 2001

(54) VEHICLE AC GENERATOR'S STATOR

(75) Inventors: Atsushi Umeda, Okazaki; Tsutomu Shiga, Nukata-gun; Shin Kusase, Obu, all of (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,885

(22) Filed: Nov. 16, 1999

(30) Foreign Application Priority Data

Nov. 26, 1998 (JP) .................................. 10-335647

(51) Int. Cl.[7] .............................. H02K 3/48; H02K 3/12
(52) U.S. Cl. ...................... 310/180; 310/184; 310/254; 310/263
(58) Field of Search ................................ 310/179, 180, 310/184, 195, 201, 203, 206, 207, 254, 263; 29/596–598

(56) References Cited

U.S. PATENT DOCUMENTS

| | | | |
|---|---|---|---|
| 1,826,295 | * 10/1931 | Apple | 310/201 |
| 2,407,935 | * 9/1946 | Perfetti et al. | 310/201 |
| 2,447,647 | * 8/1948 | Hancock | 310/179 |
| 2,731,576 | * 1/1956 | McElligott | 310/180 |
| 3,079,519 | * 2/1963 | Kitson et al. | 310/179 |
| 5,845,389 | * 12/1998 | Roberts et al. | 29/596 |
| 5,998,903 | * 12/1999 | Umeda et al. | 310/179 |

FOREIGN PATENT DOCUMENTS

| | | |
|---|---|---|
| 92/06527 | 4/1992 | (WO) . |
| 98/54823 | 12/1998 | (WO) . |

* cited by examiner

*Primary Examiner*—Tran Nguyen
(74) *Attorney, Agent, or Firm*—Pillsbury Winthrop LLP

(57) ABSTRACT

A stator for a vehicle ac generator includes a stator core having a plurality of slots and a star-connected stator winding. The stator winding has a plurality of sets of U-shaped large and small segments. The large segment has a pair of in-slot portions respectively disposed in the radially outermost slot-layer and radially innermost slot-layer. The small segment has a pair of in-slot portions respectively disposed in the radially outer middle slot-layer and radially inner middle slot-layer. Three output terminal ends respectively extend from the small segments, and three neutral terminal ends respectively extend from the large segments.

5 Claims, 8 Drawing Sheets

VEHICLE AC GENERATOR'S STATOR

CROSS REFERENCE TO RELATED APPLICATION

The present application is based on and claims priority from Japanese Patent Application Hei 10-335637 filed on Nov. 26, 1998, the contents of which are incorporated herein by reference.

BACKGROUND OF THE INVENTION

1. Field of the Invention

The present invention relates to an ac generator for a vehicle, and particularly to a stator winding arrangement of an ac generator.

2. Description of Related Art

WO 092/06527 discloses a stator in which a plurality of U-shaped conductor segments are inserted into a plurality of slots of the stator from one end thereof and welded to one another to form a stator winding. Four U-shaped conductor segments are inserted in each slot: two segments are disposed at radially inside layer; the other two segments are disposed at radially outside layer; one segment in each layer extends in one direction; and the other segment in each layer extends in the other direction. Two segments extending from one slot in one direction are welded to two segments extending from another slot in the other direction. Thus, welded portions are aligned in a circle at one end of the stator. Turn portions are also aligned in a circle at the other end of the stator.

If an output terminal end is taken from the segment disposed in the radially inside layer, the output terminal end may be distorted to incline inward. On the other hand the output terminal end may be distorted to incline outward if the terminal end is taken from the segment disposed in the radially outside layer. This causes trouble when the stator is assembled or disassembled.

SUMMARY OF THE INVENTION

An object of the invention is to provide an improved stator having output terminal ends that may not be distorted.

According to a preferred embodiment, the output terminal ends extending from the middle layer is prevented from inclining by the segments disposed in the outside and inside layers.

Another object of the invention is to provide an improved ac generator which has a star-connected stator winding. The stator winding has output terminal ends extending from the segments disposed in the middle layer and neutral terminal ends extending from the segments disposed in the inside layer. Because the neutral terminal ends are taken from the segments disposed in the inside layer, gathered, and welded, they are sufficiently spaced apart to be insulated from frames and output terminals.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
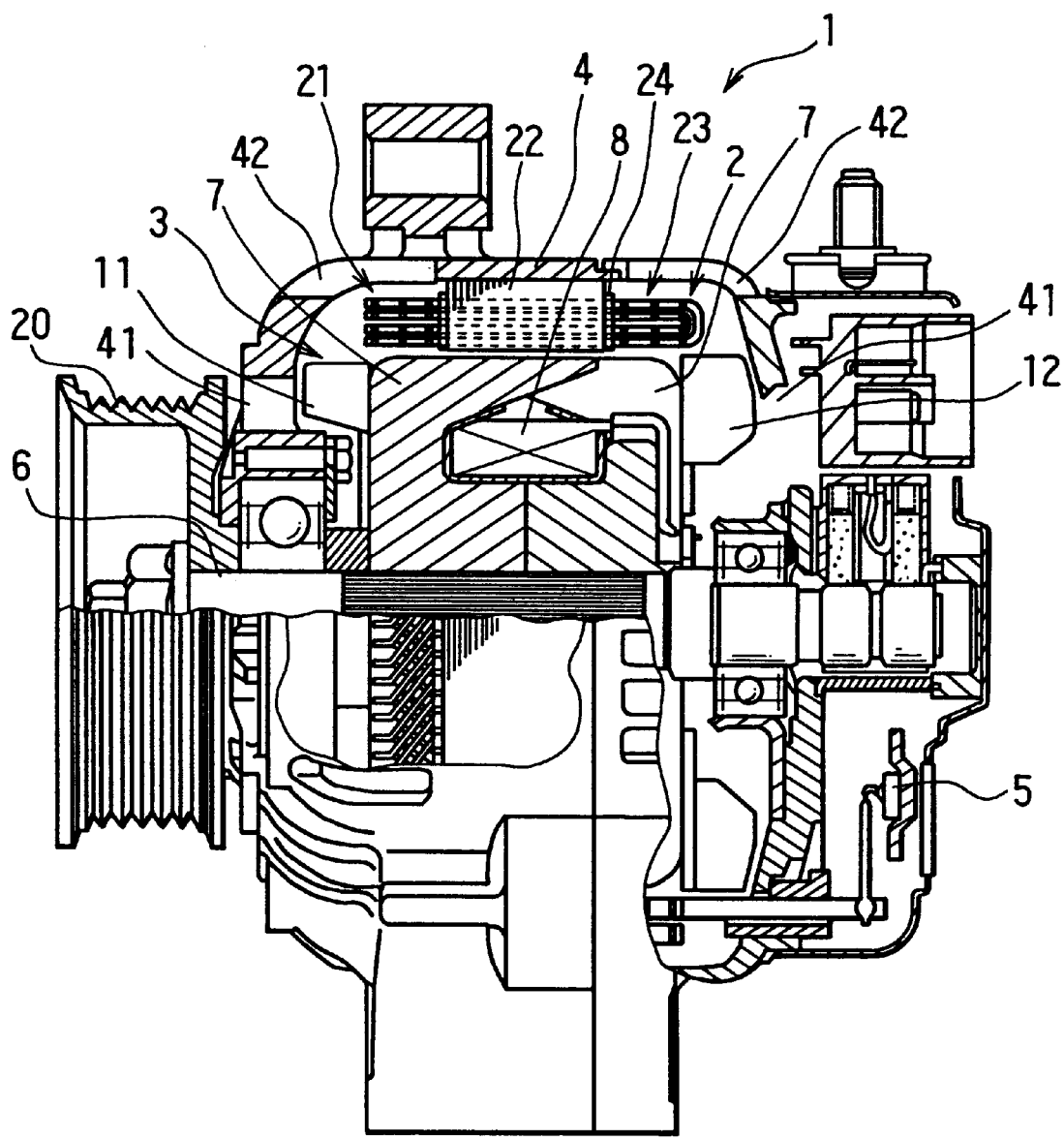
FIG. 1 is a partially cross-sectional side view of a vehicle ac generator having a stator according to a preferred embodiment of the invention.
Figure 2:
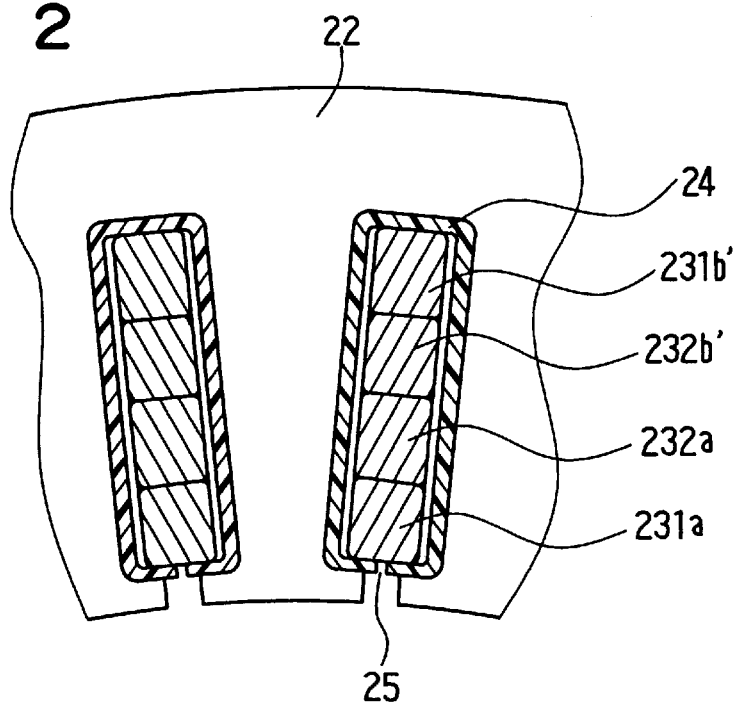
FIG. 2 is a fragmentary plan view illustrating the stator according to the preferred embodiment.
Figure 3:
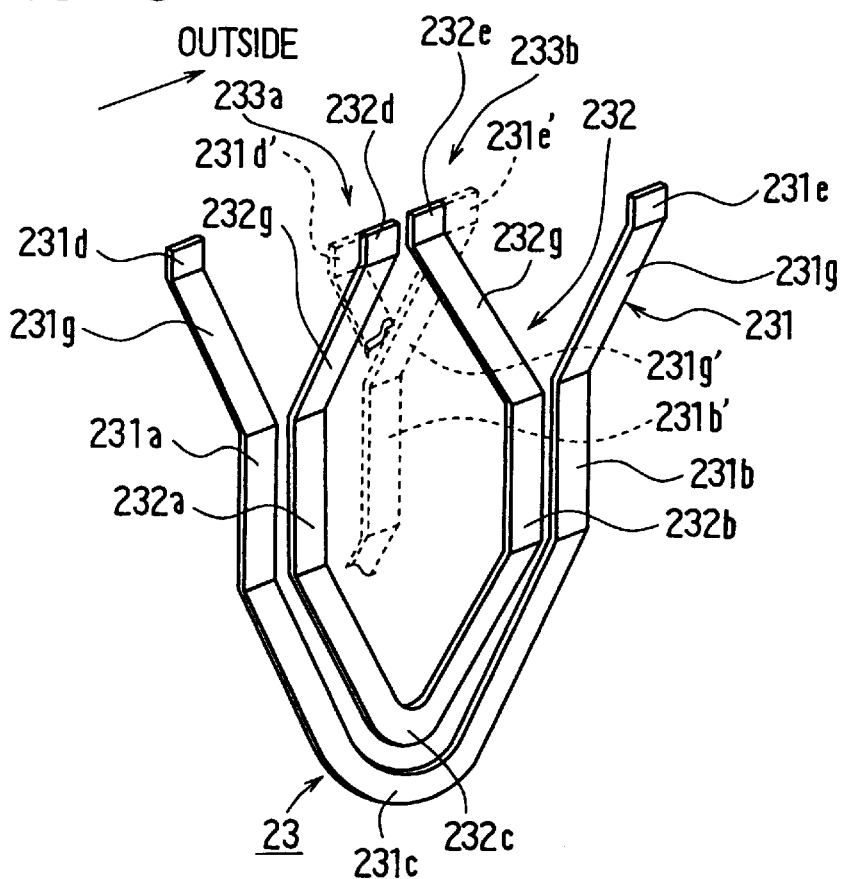
FIG. 3 is a schematic view of conductor segments forming a stator winding of the stator.

As shown in FIGS. 1–3, a vehicle ac generator 1 includes stator 2, rotor 3, frame 4, rectifier unit 5 and others.

Stator 2 includes stator core 22 having a plurality of (e.g. 36) slots 25, a plurality of sets 23 of large and small U-shaped conductor segments 231, 232 forming a stator winding and insulators 24.

Rotor 3 has shaft 6, a pair of pole cores 7 respectively having six claw poles, cylindrical field coil 8 enclosed by the claw poles. Mixed flow fan 11 and centrifugal flow fan 12 are respectively welded to the front end and rear end of the pair of pole cores 7.

Frame 4 accommodates stator 2 and rotor 3 so that rotor 3 can rotate with shaft 6 inside stator 2. Frame 4 has a plurality of air intake windows 41 at the central portion of front and rear frame ends and a plurality of air discharge windows 42 at portions opposite coil-ends of the stator winding.

AC generator 1 is driven by an engine through a belt (not shown) and pulley 20. When field coil 8 is energized, the claw poles are excited to cause the stator winding to provide three-phase ac power at the three output terminal ends thereof. Regulator unit 5 converts the ac power into dc power as the output power of ac generator.

Large U-shaped conductor segment 231 has a pair of in-slot portions 231*a* and 231*b*, outwardly inclined portions 231*g* and turn portion 231*c*. Small U-shaped conductor segment 232 has a pair of in-slot portions 232*a* and 232*b*, inwardly inclined portions 232*g* and turn portion 232*c*. Large U-shaped conductor segments (hereinafter referred to as large segments) 231 generally enclose small U-shaped conductor segments (hereinafter referred to as small segments) 232.

Two in-slot portions 231*a* and 232*a* of a set of large and small segments 231 and 232, and two in-slot portions 232*b'*, 231*b'* of other two sets of large and small segments are inserted into one of slots 25 and aligned in four radial layers: innermost layer, inner middle layer, outer middle layer and outermost layer. As shown in FIG. 3, the other in-slot portion 231*b* of the set having in-slot portions 231*a* and 232*a* is inserted into the slot one-pole-pitch clockwise spaced apart, and the other in-slot portion 232*b* of the same set is inserted into the slot one-pole-pitch counter-clockwise spaced apart.

At one end (hereinafter referred to as the connection end) of stator core 22, in-slot portion 232*a* disposed in the inner middle layer is connected at joint portion 233*a* of segment ends 232*d*, 231*d'* via the corresponding inclined portions to the in-slot portion of another set disposed in the outer middle layer of the slot one pole-pitch clockwise spaced apart therefrom, and in-slot portion 231*b'* disposed in the outer-most layer shown in FIG. 3 is connected at another pair 233*b* of segment ends 232*e*, 231*e'* via the corresponding inclined portions to in-slot portion 232*b* shown in FIG. 2. Thus, all the in-slot portions are connected in the same manner described above so that a plurality of pairs of segment ends are disposed spaced apart along two concentric circles above an end of stator core 22. The connection is carried out by a welder such as a ultrasonic welder or arc welder or by soldering to form a stator winding as described below with reference to FIGS. 4, 5 and 6.

The joint portions or the pairs of segment ends are coated with insulating material. Insulation spacer members can be inserted between the pairs of segment ends to ensure the reliability under severe vibration or other severe conditions.

At the other end (hereinafter referred to as the turn end) of stator core 22, all the turn portions of large segments 231 including turn portion 231*c* form continuous outside-coil-ends and all the turn portions of small segments 232 including turn portion 232*c* form continuous inside-coil-ends.

As a result, effective cooling passages are formed between the coil-ends at both the connection end and the turn end for the cooling air driven by cooling fans 11 and 12.

Figure 4:
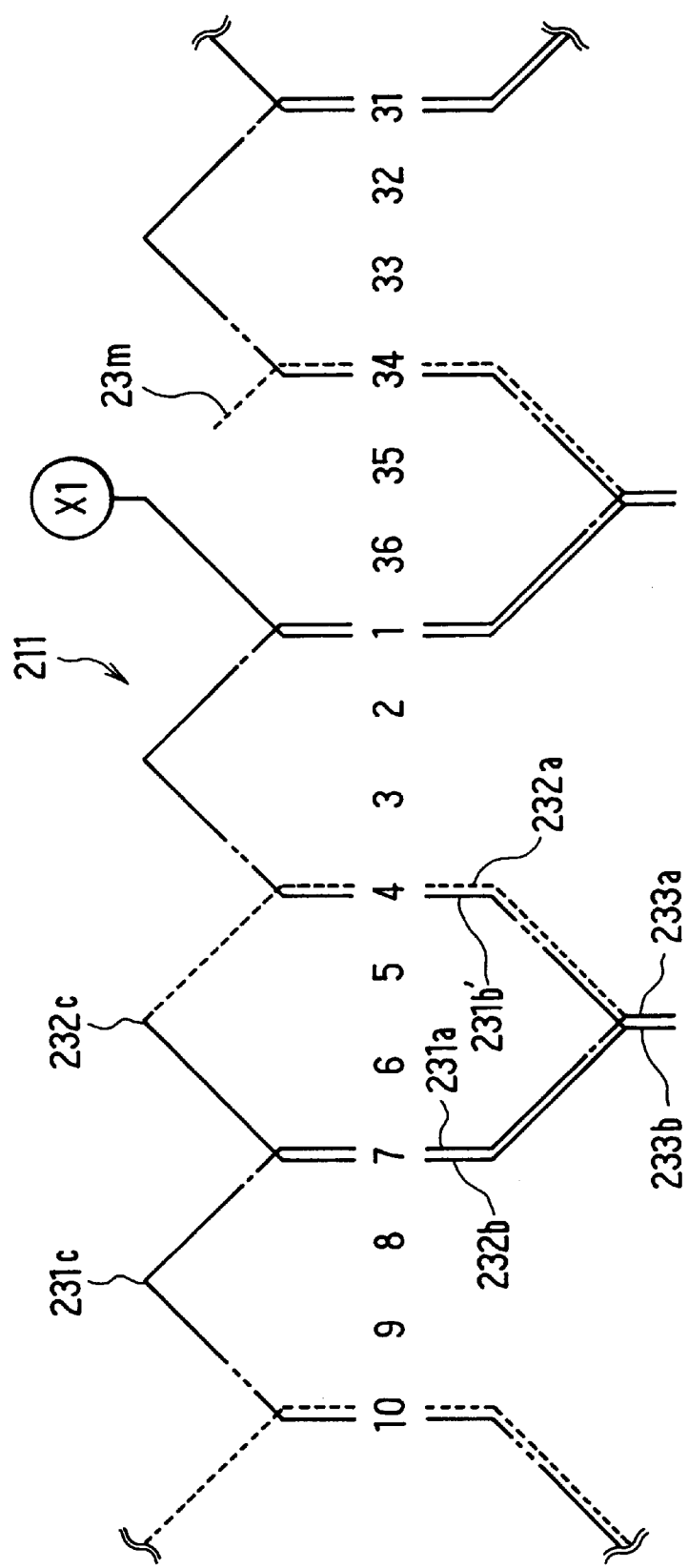
FIG. 4 is a winding diagram of a portion of the stator winding.
Figure 5:
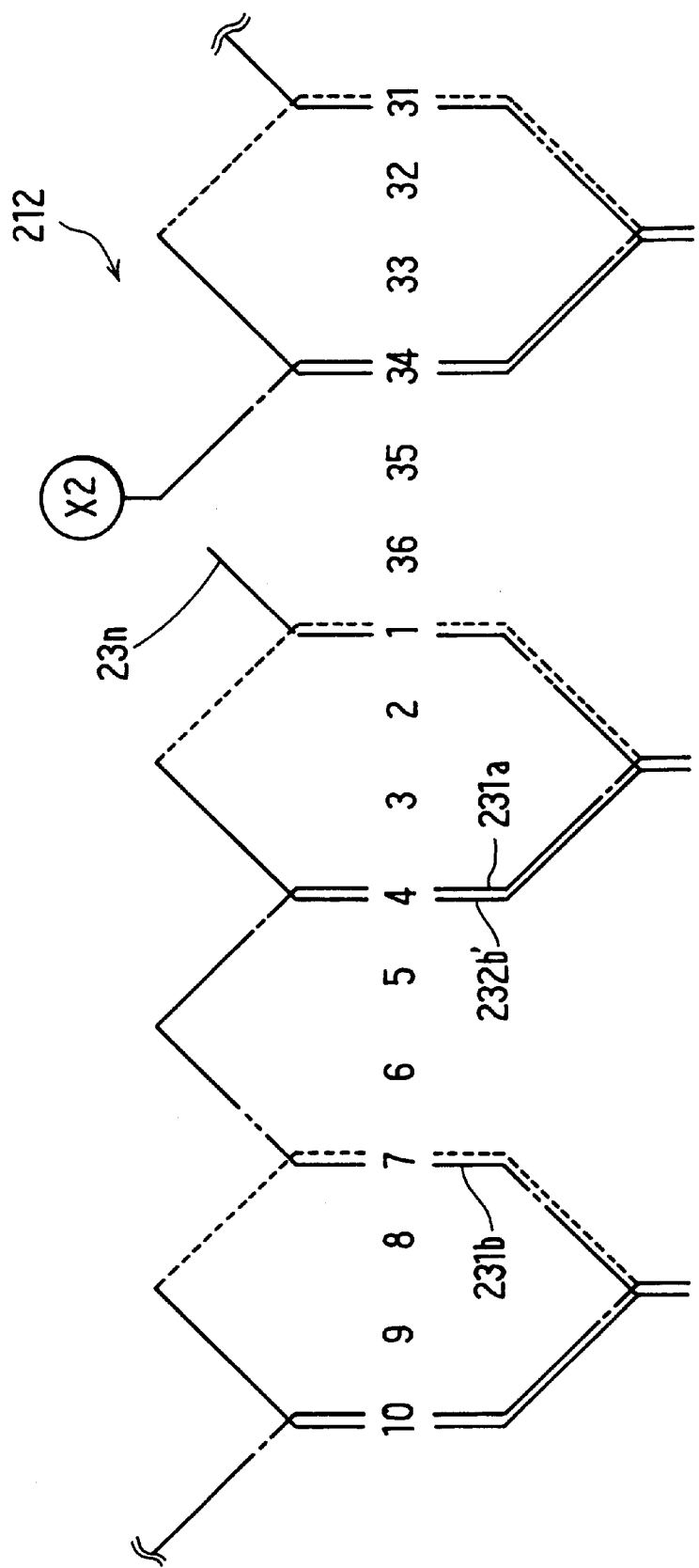
FIG. 5 is a winding diagram of a portion of the stator winding.
Figure 6:
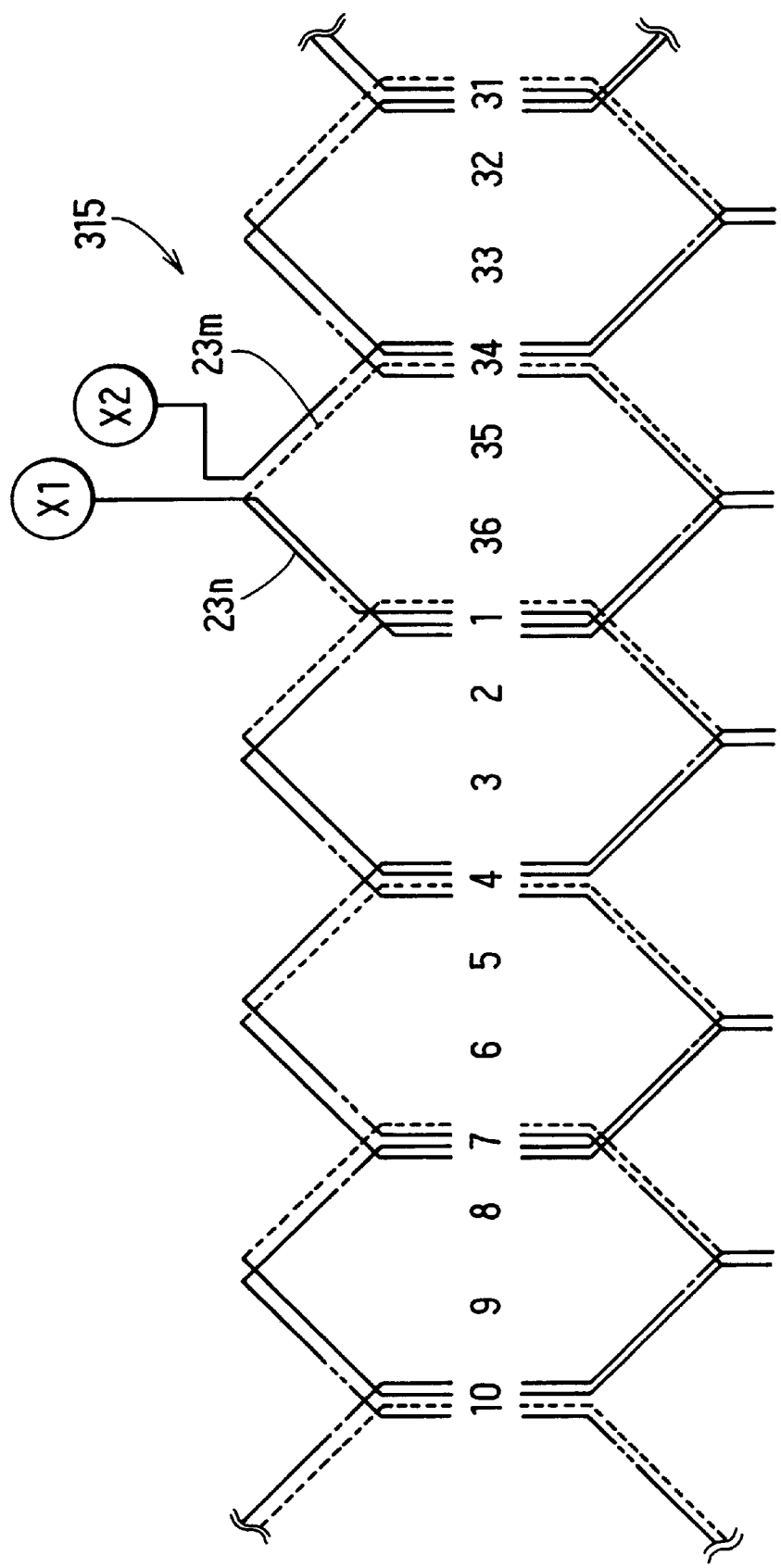
FIG. 6 is a winding diagram of a portion of the stator winding.

The stator winding includes three phase-windings 315, and one of phase-windings 315, for example X-phase winding, is composed of first and second winding sections 211 and 212 as shown in FIGS. 4–6. Numerals disposed at the middle of the drawings indicate respective slot numbers. A solid line shows the in-slot portion (e.g. 232*b*) of small segment 232 disposed in the outer middle layer of the slot (e.g. slot No. 7); a dotted line shows the in-slot portion (e.g. 232*a*) of small segment 231 disposed in the inner middle layer of the slot (e.g. slot No. 4); one-dot-chain line shows the in-slot portion (e.g. 231*a*) of large segment 231 disposed in the innermost layer of the slot (e.g. slot No. 7); and two-dot-chain line shows the in-slot portion (e.g. 231*b*) of large segment disposed in the outermost layer of the slot (e.g. slot No. 4).

First winding section 211 of X-phase winding 315 has output terminal end X1 extending from the turn end of stator core 22. Terminal end X1 is formed from an I-shaped specific segment having an in-slot portion disposed in the outer middle layer of slot No. 1. First winding section 211 also has a U-shaped specific segment having a portion 23*m* having an in-slot portion disposed in the inner middle layer of slot No.34.

Second winding section 212 has neutral terminal end X2 extending from the turn end of stator core 22. Terminal end X2 is formed from an I-shaped specific segment having an in-slot portion disposed in the innermost layer of slot No. 34. Second winding section 212 also has a U-shaped specific segment having portion 23*n* having an in-slot portion disposed in the outermost layer of slot No. 1.

Portions 23*m* and 23*n* as U-shaped specific segments are connected to each other at the turn end of stator core 22 to form X-phase winding 315 composed of series-connected winding sections 211 and 212 as shown in FIG. 6. Y-phase winding and Z-phase winding are respectively formed in the same manner as above.

Figure 7:
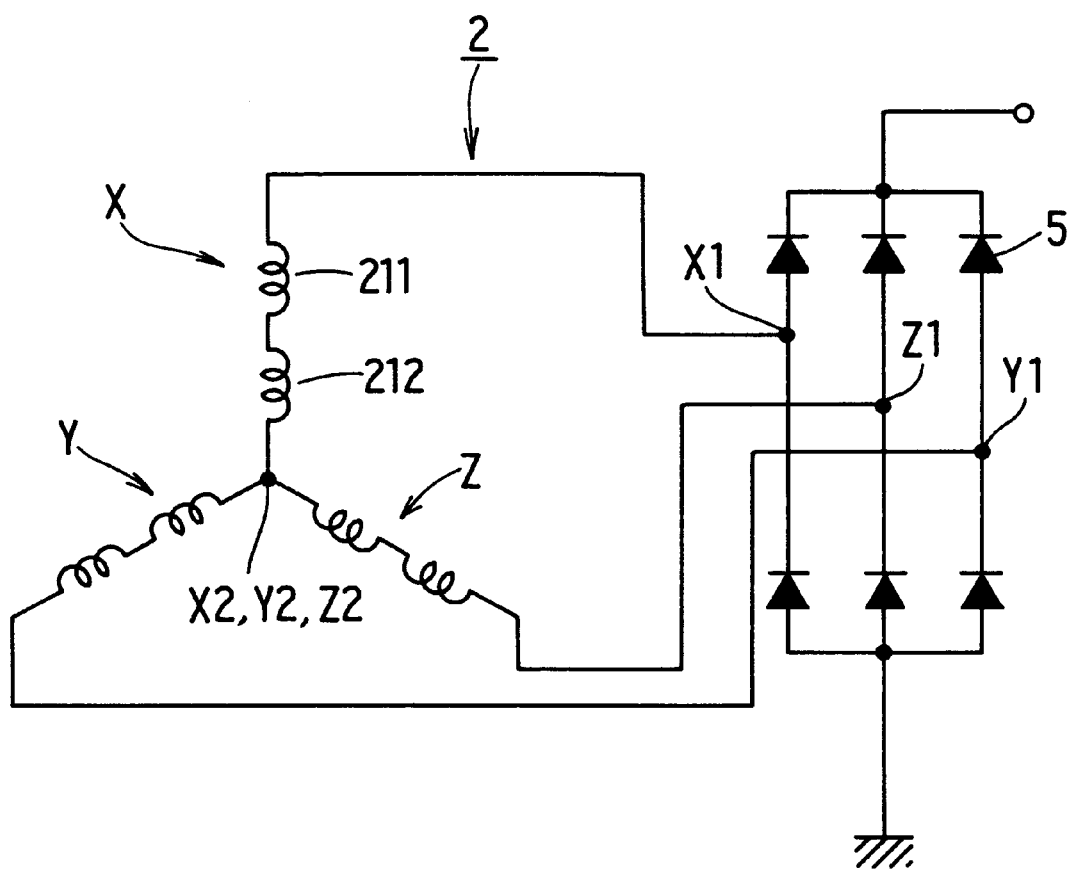
FIG. 7 is a schematic circuit diagram of the ac generator having the stator according to the preferred embodiment.
Figure 8:
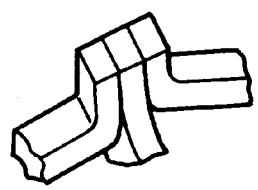
FIG. 8 is a fragmentary perspective view of a neutral terminal end.

As shown in FIG. 7, output terminal ends X1, Y1 and Z1 are respectively connected to input terminals of rectifier unit 5, and neutral terminal ends X2, Y2 and Z2 are also connected to each other, as shown in FIG. 8.

Figure 9:
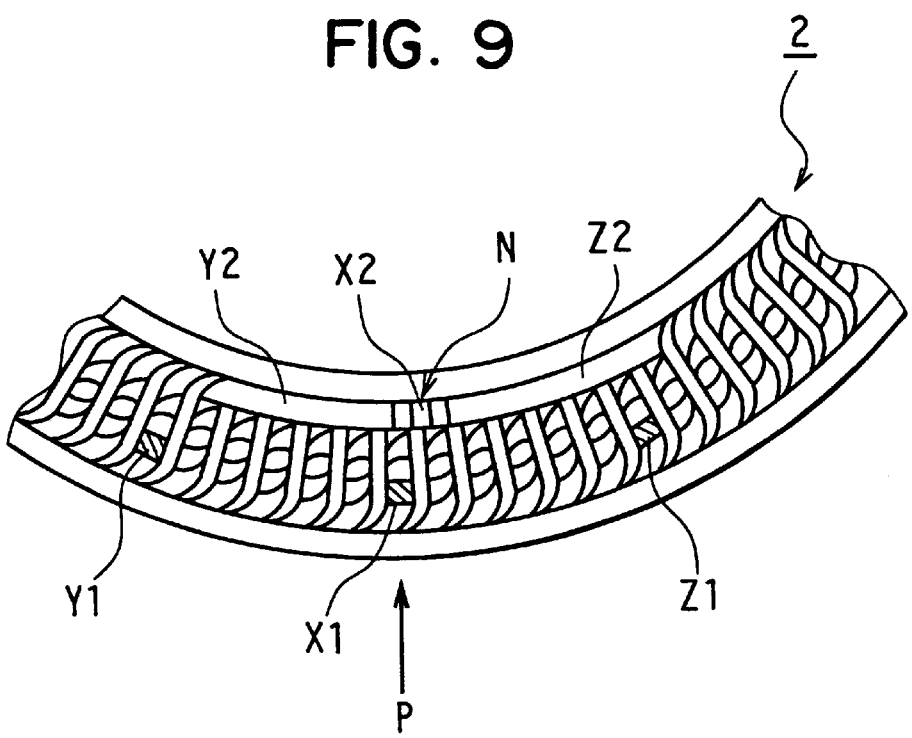
FIG. 9 is a fragmentary schematic plan view of the stator.
Figure 10:
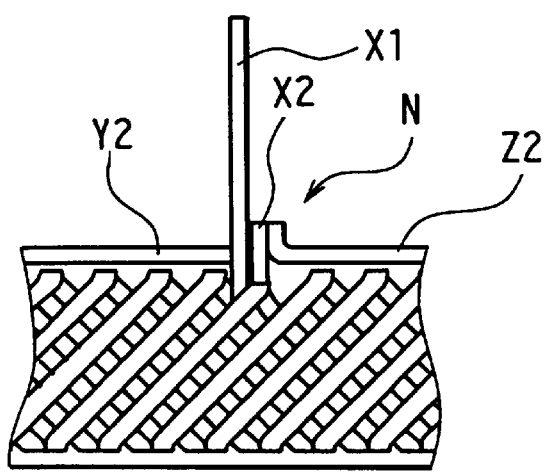
FIG. 10 is a schematic side view of the stator viewed from point P in FIG. 9.

As shown in FIGS. 9 and 10, output terminal ends X1, Y1, and Z1 extend outward from the turn end of stator core 22 whose in-slot potions are disposed in the outer middle layer of slots 25. Thus, output terminal ends X1, Y1, and Z1 are respectively supported by the turn portions 231*c* and 232*c* of other segments 231, 232 in both radial and circumferential directions.

Figure 11:
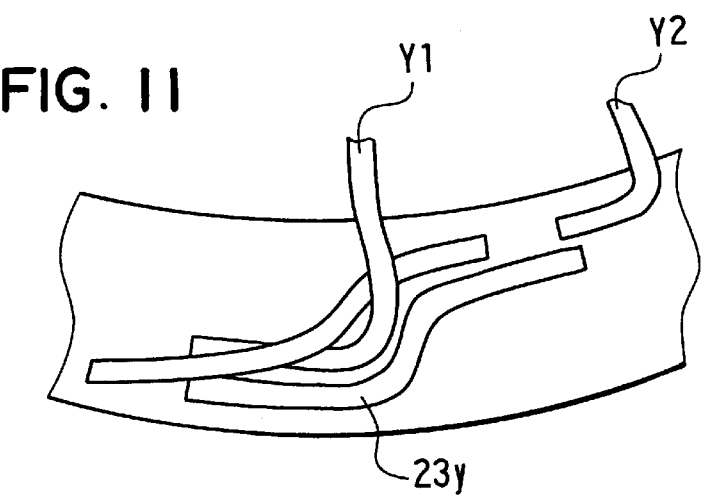
FIG. 11 is a fragmentary schematic view illustrating a main portion of terminal ends.
Figure 12:
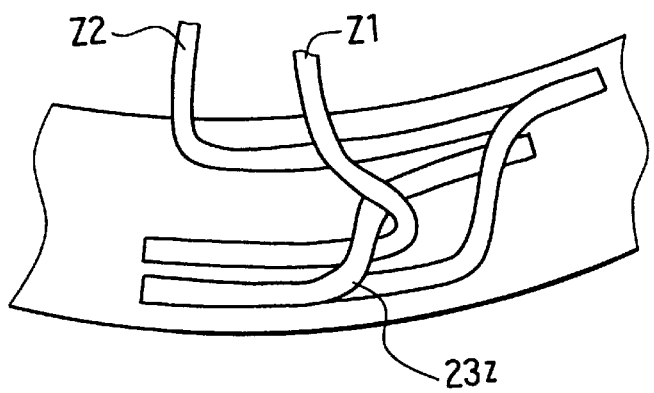
FIG. 12 is a fragmentary schematic view illustrating a main portion of terminal ends.

Specific segment 23*y* which is an end of a winding section of Y-phase winding to be connected to another winding section thereof, output terminal end Y1, and neutral terminal end Y2 of the same are disposed as shown in FIG. 11. Specific segment 23*z* which is an end of a winding section of Z-phase winding to be connected to another winding section thereof, Z-phase winding, output terminal end Z1, and neutral terminal end Z2 are disposed as shown in FIG. 12.

Because neutral terminal ends X2, Y2, Z2 respectively extend from the innermost slot layer and welded together, they are not easily deformed or moved by external force. Because neutral terminal ends X2, Y2, Z2 are located remote from the wall of frame 4, insulation thereof from frame can be assured easily.

Figure 13:
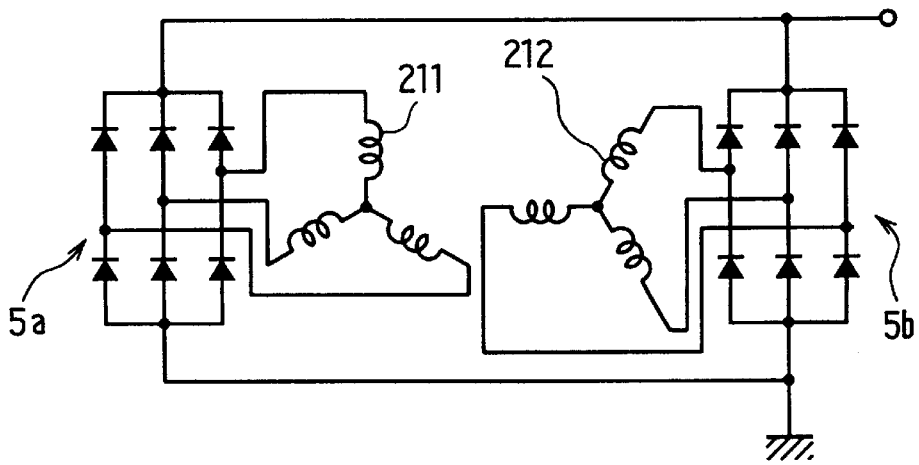
FIG. 13 is a schematic circuit diagram of the ac generator having a variation of the stator according to the preferred embodiment.

As a variation, the stator winding comprises two three-phase windings as illustrated in FIG. 13. For example, winding section 211 of X-phase winding shown in FIG. 4 and other corresponding winding sections of y-phase and Z-phase windings are star-connected to form the first three-phase winding, and winding section 212 of X-phase winding shown in FIG. 4 and other corresponding winding sections of y-phase and Z-phase windings are star-connected to form the second three-phase winding. The first and second three-phase windings are shifted in electric angle from each other, and respectively connected to two rectifier units 5*a* and 5*b*.

Conductor segments other than U-shaped segments such as I-shaped segments or a continuous wire can be used in the same manner described above. The star-connected three-phase winding can be replaced with a Δ-connected winding.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator for a vehicle ac generator comprising:

a stator core having a plurality of slots, said slot having radially aligned four slot layers;

a star-connected stator winding comprising a plurality of sets of U-shaped large and small segments, said large segment having a pair of in-slot portions respectively disposed in radially outermost slot-layer and radially innermost slot-layer, said small segment having a pair of in-slot portions respectively disposed in radially outer middle slot-layer and radially inner middle slot-layer;

three output terminal ends respectively extending from said small segments; and three neutral terminal ends respectively extending from said large segments.

2. A stator for a vehicle ac generator comprising:

a stator core having a plurality of slots;

a star-connected stator winding comprising a plurality of in-slot portions respectively disposed in radially outside layer, at least one radially middle layer and radially inside layer output lead wires extending from said middle layer;

three output terminal ends; and three neutral terminal ends extending from one of said outside layer and inside layer.

3. A stator for a vehicle ac generator comprising:

a stator core having a plurality of slots;

a stator winding having a plurality of in-slot portions respectively disposed in radially outside layer, at least one radially middle layer and radially inside layer; and output lead wires extending from said middle layer.

4. The stator as claimed in claim 3, wherein said stator winding comprises three phase star-connected windings having a neutral point, and neutral terminal ends respectively extend from said radially inside layer and connected to each other to form said neutral point.

5. The ac generator as claimed in claim 3, wherein said stator winding comprises a plurality of U-shaped segments having a U-turn portion disposed at a first end of said stator core and a pair of segment ends disposed at a second end of said stator and connected to one another, and said output lead wires extend from said first end.

* * * * *

UNITED STATES PATENT AND TRADEMARK OFFICE
CERTIFICATE OF CORRECTION

PATENT NO. : 6,211,594 B1  
DATED : April 3, 2001  
INVENTOR(S) : Umeda et al.

Page 1 of 1

It is certified that error appears in the above-identified patent and that said Letters Patent is hereby corrected as shown below:

<u>Title page,</u>  
Please change "[30] Foreign Application Priority Data,  
"November 26, 1998     (JP)............................................10-335647"  
                                                to  
-- November 26, 1998     (JP)............................................10-335637 --

Signed and Sealed this

Twenty-ninth Day of January, 2002

Attest:

*Attesting Officer*

JAMES E. ROGAN  
*Director of the United States Patent and Trademark Office*